United States Patent [19]

Blaetterlein

[11] 4,183,986
[45] Jan. 15, 1980

[54] METHOD FOR MAKING STRAPS

[75] Inventor: Matthias Blaetterlein, Watertown, Conn.

[73] Assignee: Timex Corporation, Waterbury, Conn.

[21] Appl. No.: 969,636

[22] Filed: Dec. 14, 1978

[51] Int. Cl.² ................. B31F 1/00; A45C 11/10
[52] U.S. Cl. ..................... 428/160; 156/209; 156/220; 156/226; 156/292; 224/178; 428/315
[58] Field of Search ............ 156/209, 219–220, 156/217, 211, 292, 226, 227, 461, 200–202, 199; 224/178; 24/265 WS; 264/26, 46.4, 293, 284; 428/158–160, 315

[56] References Cited

U.S. PATENT DOCUMENTS

| | | | |
|---|---|---|---|
| 3,362,595 | 1/1968 | Herzog | 224/178 |
| 3,447,993 | 6/1969 | Herzog | 156/461 |
| 3,469,749 | 9/1969 | Tabata | 24/265 WS |
| 3,543,975 | 12/1970 | Bauer | 224/178 |
| 3,962,013 | 6/1976 | Mashida | 264/26 X |
| 4,110,139 | 8/1978 | Mashida | 156/209 |

*Primary Examiner*—David A. Simmons
*Attorney, Agent, or Firm*—Edward J. Timmer

[57] ABSTRACT

Disclosed is a method for making a laminated thermoplastic sheet from which can be cut one or more embossed straps having a loop at least at one end for receiving the cross-pin of a watch, buckle or the like. In a preferred method, a sandwich of an expanded thermoplastic layer and an unexpanded thermoplastic layer, for example, expanded polyvinyl chloride and unexpanded polyurethane, is subjected (a) to a flow molding step to not only bond the layers together but also to emboss the free surface of the expanded layer and form an elongated groove in at least the unexpanded layer, (b) to a folding step about the longitudinal axis of the groove to form a U-shaped second sandwich with the unexpanded layer pressed onto itself and with a loop at one end formed by the folded-over groove portion, (c) to a bonding step to bond the unexpanded layer to itself without closing the loop or distorting the embossed free surface of the expanded layer and (d) to a cutting step for producing the desired strap shape from the bonded second sandwich with the strap having the loop at one end and in the as-cut position. Both the tongue and buckle portion of a watch strap can be thereby mass produced with appearance and feel closely resembling that of a natural leather strap.

27 Claims, 10 Drawing Figures

METHOD FOR MAKING STRAPS

FIELD OF THE INVENTION

The present invention relates to methods for making straps, such as watch straps, and components thereof and, more particularly, to techniques for manufacturing laminated thermoplastic straps, especially those of the artificial leather type.

DESCRIPTION OF THE PRIOR ART

Watch straps of natural leather feel and appear unique and are thus highly appreciated. However, as a result of numerous disadvantages associated with leather straps, not the least of which is their high cost, prior art workers have attempted to simulate the appearance and feel of leather straps by forming straps of laminations of thermoplastic layers and embossing one or more of the layers with a leather-like pattern. Commonly in the past, the laminated strap comprised a top thermoplastic layer embossed to resemble leather, a center layer of plastic, glass or other cloth to provide dimensional stability and a bottom layer of thermoplastic material textured or embossed to provide a feeling of comfort against the wrist of the wearer. Typically, the three layers are joined by heat sealing along their edges and through the holes in the strap to impart the overall feel of a leather strap thereto. The loop for receiving the pin bar of the watch was formed by folding one or more of the layers onto itself prior to heat sealing the edges. Representative of this type of strap and process for making it are the Herzog patents, U.S. Pat. Nos. 3,362,595 and 3,543,975 which issued Jan. 9, 1968 and Dec. 1, 1970, respectively. Apparatus for the mass production of such straps is illustrated in the Herzog patent, U.S. Pat. No. 3,447,993 which issued June 3, 1969. In this apparatus, tapes representing the three different layers are automatically fed into a heat sealing station in the desired sandwich relation and a conventional sealing tool heat seals a narrow band of the sandwich in the outline of the strap. The formed thermoplastic watch straps are merely broken out of the tape sandwich after heat sealing the outline thereof. The loop at the end of the strap is formed automatically as the tapes enter the apparatus and a nylon filament or string is inserted through the loop to prevent its closing during the heat sealing operation.

Another somewhat different porcess for forming laminated thermoplastic straps is illustrated in the Mashida British Pat. No. 1,491,532 filed Mar. 13, 1974. In this process of silicone rubber mold is formed by pouring liquid silicone rubber over a master of the strap to be made. The master includes a leather surface which is imparted to the silicone rubber as it sets. A laminated thermoplastic strap in the desired shape but without embossed surfaces is placed in the mold and heated by high frequency electric induction. Since one of the layers of the laminated strap includes an expanding or foaming agent, internal pressure is generated during this heating, causing the strap to be pressed against the embossed mold surface and receive the desired leather texture. The unembossed strap is provided by punching the desired strap shape from a sandwich of thermoplastic layers and then heat sealing the peripheral edges of the shape. Thus, the strap shape is formed prior to the embossing operation in the silicone mold.

SUMMARY OF THE INVENTION

The present invention provides a method for making a laminated thermoplastic sheet from which one or more embossed straps having a loop at least at one end thereof for receiving the cross-pin of a watch, buckle or the like can be easily cut. The invention is especially useful in mass producing watch straps, both the tongue and buckle portions thereof, which have the appearance and feel of leather straps.

According to a typical embodiment of the invention, the laminated thermoplastic sheet is made by forming a first sandwich of at least a first layer of embossable thermoplastic material, e.g. expanded polyvinylchloride the free surface of which is embossable with a pattern, and at least a second layer of reinforcing thermoplastic material, e.g. unexpanded polyurethane, and then inserting the first sandwich into a mold with a first patterned working surface in contact with the free surface of the first (embossable) layer and a second working surface having an elongated projection, such as a rib, in contact with the second (reinforcing) layer. The sandwich is then heated under pressure to not only bond the first and second layers together but also to emboss the pattern on the free surface of the first layer and form an elongated groove, corresponding to the projecting rib, in at least the second layer. Preferably, the mold is silicone rubber and heating is achieved by placing the mold and first sandwich therein in a high frequency electric induction device. The temperature of the first sandwich is raised so that flow molding occurs. After flow molding, the bonded first sandwich is folded onto itself about the longitudinal axis of the elongated groove to form a U-shaped second sandwich with the second (reinforcing) layer pressed onto itself and with a loop at one end formed by the folded-over groove portion. This second sandwich is then preferably placed in another high frequency induction device for bonding the second layer to itself without closing the loop at the end and without distorting the embossed free surface of the first layer. Closing of the loop and distortion of the embossed free surface are preferably prevented during this step by employing cooled pressure plate electrodes in the device with an insulating insert in one of the electrodes adjacent the loop.

The laminated embossed thermoplastic sheet thus produced is generally rectangular in shape with the loop along one of the sides of the rectangle. Watch or other straps requiring a loop at least at one end can be readily cut from this laminated sheet, for example, by die cutting to provide a straight edge finish. If desired, cutting of the strap shape can be conducted with the sheet, except for the loop, is heated so that the first (embossable) layer flows plastically around the cut edges to hide the layered structure of the strap and provide a rolled edge finish.

In a particular preferred embodiment for making a strap having loops at opposite ends, the mold may be provided with a second working surface having a primary elongated projection for forming a primary groove in the laminated sheet, and one or two secondary elongated projections spaced equidistant and parallel from the primary projection for forming secondary grooves in the laminated sheet in the same positional relation to the primary groove. After flow-molding, the bonded first sandwich is folded onto itself about the central longitudinal axis of the primary groove to form a U-shaped sandwich with the second (reinforcing)

layer pressed onto itself and with a loop formed at one end by the folded-over groove portion and near the other end by the secondary groove against the second layer or by the secondary grooves, if two are provided, in registry with one another. After bonding the second layer to itself to produce the fully laminated sheet, straps having loops near opposite ends can be cut.

DESCRIPTION OF THE DRAWINGS

The invention will be better understood by reference to the following description taken in connection with the accompanying drawings, in which.

DESCRIPTION OF THE PREFERRED EMBODIMENT

Although the invention is described in detail hereinbelow with reference to the manufacture of laminated thermoplastic watch straps having the feel and appearance of leather, this is merely for purposes of illustration rather than limitation. The inventive process may be used in the manufacture of any strap requiring a loop at least at one end thereof, for example, belts, harnesses, collars, and the like. In addition, the straps may be embossed with not only a leather texture but also any desired decorative finish.

Figure 1:
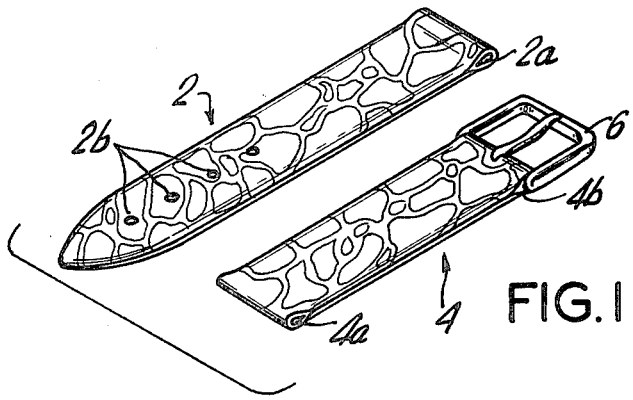
FIG. 1 is a perspective view of a watch strap tongue and buckle portion which can be made by the process of the invention.

Referring first to FIG. 1, a laminated thermoplastic watch strap comprising a tongue portion 2 and a buckle portion 4 is shown. The tongue portion includes a loop 2a at one end thereof to receive the pin bar (not shown) which is used with a conventional watch to hold the strap to the lugs of the watch case. At the opposite end of the tongue portion is a linear arrangement of spaced holes 2b through which the bail of the buckle passes in well known fashion. The buckle portion 4 includes a pin bar loop 4a at one end serving the same function as the loop 2a of the tongue portion and also buckle loop 4b at the other end to receive the cross-pin of the buckle 6. As is apparent, both the tongue and buckle portions of the watch strap have a leather texture embossed on the surfaces which ordinarily are visible when the watch strap is worn on the wrist. If a clasp is to be employed instead of a buckle, the tongue portion may include a loop at each end thereof.

The present invention provides a method for making a laminated thermoplastic sheet from which the embossed tongue and buckle portions of the strap can be readily cut by conventional means with a loop being provided at one or both ends in the as-cut condition. To avoid redundancy, the following detailed embodiment of the invention relates to the process of the invention adapted especially for making the buckle portion of the strap; i.e. a strap having a loop at or near opposite ends. The technique utilized for manufacturing the tongue portion is very similar except that usually only one end thereof requires a loop.

Figure 2:
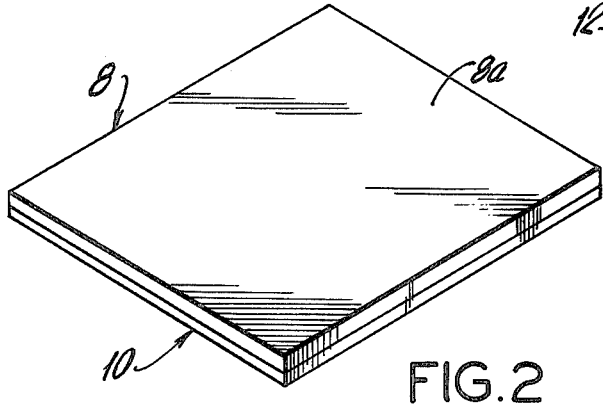
FIG. 2 is a perspective view showing the first sandwich of expanded and unexpanded thermoplastic layers.
Figure 3:
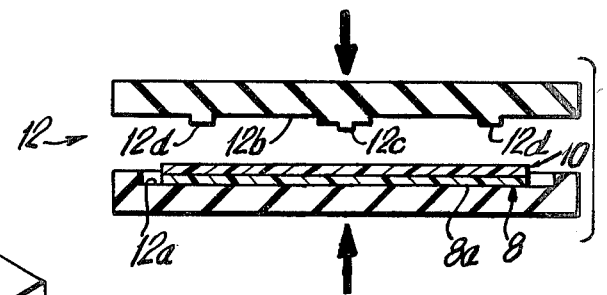
FIG. 3 is a schematic section of the first sandwich in the mold of silicone rubber.
Figure 4:
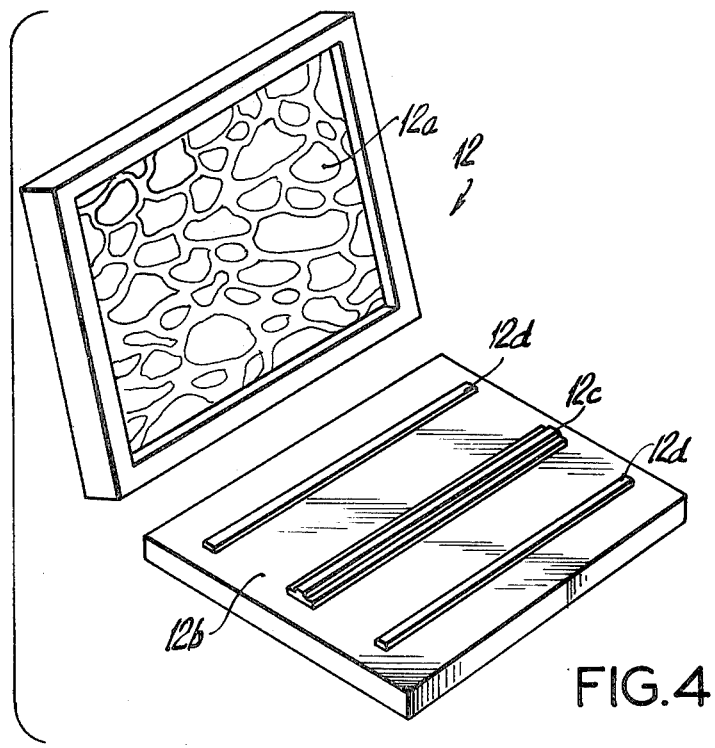
FIG. 4 shows a perspective view of the working surfaces of the mold.

FIG. 2 illustrates the first sandwich of an expanded thermoplastic layer 8 and unexpanded thermoplastic layer 10. The first sandwich is typically formed by cutting rectangular sheets from the expanded and unexpanded materials and then merely placing one sheet on top of the other. The expanded thermoplastic layer is substantially porous and includes a free surface 8a which is embossable with the desired leather texture or any other decorative pattern. Preferably, the expanded thermoplastic layer 8 comprises expanded polyvinyl chloride or expanded polyurethane; e.g. sold under the name Tolex (PVC) by General Tire Co. or Porvair (polyurethane) by Inmont Corp. in sheet form. These materials are thermoplastic, having a melting point of about 300° to 380° F. (149°–193° F.). The unexpanded thermoplastic layer 10 is preferably a polyurethane sheet having a melting point of about 325° F. (163° C). Although the thickness of the layers 8 and 10 may be varied, a polyvinyl chloride layer of 0.035 inch thickness and a polyurethane layer of 0.018 inch thickness have been found satisfactory in producing a watch strap having the overall feel from a flexibility standpoint of leather but having improved physical properties such as strength. Of course, other thermoplastic materials are usable in the invention and include polyurethane-polyvinyl chloride copolymers, ethylenevinyl acetate, nylon and generally any thermoplastic material responsive to high frequency energy. Although expanded thermoplastic materials are now preferred for use as the embossable first layer, solid materials may be substituted therefor if they possess sufficient softness. As shown in FIG. 3, the first sandwich is then placed in a silicone rubber mold 12 having a lower half and upper half. The lower half includes a first working surface 12a patterned with the desired texture, for example, leather in this embodiment, to be imparted to the free surface 8a of the expanded layer. The upper half includes a second working surface 12b having a primary elongated rib 12c or projection and secondary elongated ribs 12d on opposite sides thereof equidistant and parallel thereto. As will be apparent hereafter, the primary and secondary ribs are intended to form corresponding grooves in at least the unexpanded layer 10, the groove corresponding to primary rib 12c providing one loop at the end of the buckle portion when folded-over and the grooves corresponding to secondary ribs 12d providing another loop at the other end of the folded-over buckle portion. To this end, the secondary ribs are each spaced from the primary groove by the distance desired between the pin bar loop and buckle cross-pin loop for a particular watch strap buckle portion. FIG. 4 is a perspective view of the silicone rubber mold showing the first and second working surfaces. For the polyvinyl chloride and polyurethane layers employed, the height of the primary and secondary ribs was 0.050 and 0.030 inch, respectively, while the width was 0.300 and 0.125 inch respectively.

Figure 5:
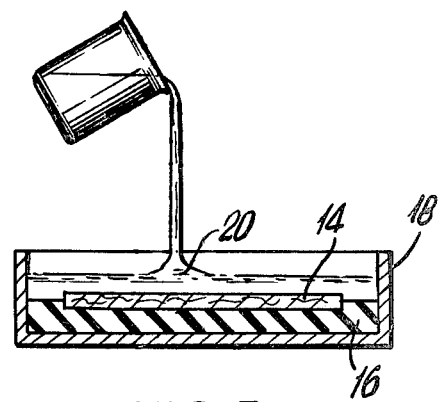
FIG. 5 is a schematic view illustrating a technique for forming a silicone rubber mold for use in a preferred process of the invention.

A technique for making the upper half of mold 12 with the first working surface patterned to resemble leather is illustrated in FIG. 5. A rectangular piece of natural leather 14 is placed on the bottom plate 16 of a container 18 to form a master. Liquid silicone rubber 20 of a slowly setting type is poured onto the leather master and allowed to set. As it sets, the silicone rubber receives the unique pattern of the natural leather with all its grain and unevenness and constitutes the first working mold surface. Of course, if it is desired to have a different leather or other texture on the wrist side of the strap, the master can be provided in two half sections of the desired diffrent textures as will be apparent to those skilled in the art. The second working surface of the mold is formed in a similar manner by pouring the liquid silicone rubber over a master having the primary and secondary ribs projecting therefrom.

Figure 6:
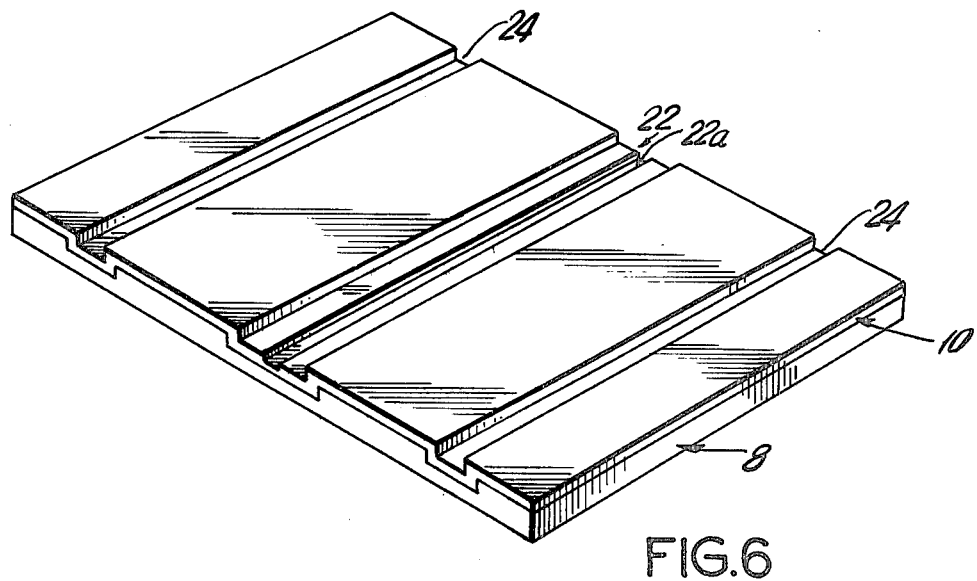
FIG. 6 is a perspective view of the first sandwich after flow molding.

The mold of FIG. 3 with the first sandwich therein is then placed in a high frequency induction device (not shown) to heat the expanded and unexpanded layers to a temperature at which the layers are thermoplastic or in a flowable condition, the device also pressing the mold in the direction of the arrows by the use of suitable flat pressure plate electrodes. Such high frequency induction devices are well known in the art, a device found usable in the present invention being sold under the designation Compo Fit-High Frequency Flow Molding machine by Comp Industries. With the polyvinyl chloride and polyurethane layers employed herein, a suitable frequency range for the electric induction heater is from 20 M $H_z$ to 60 $MH_z$ and suitable heating temperature ranges from 300° to 350° F. (149° to 177° C.). Generally, pressure is maintained during heating-molding and cooling for from 10 to 30 seconds. During this step, the expanded polyvinyl chloride layer 8 and polyurethane layer 10 are securely bonded together. As a result of the flowability of the materials, the free surface 8a of the polyvinyl chloride layer conforms to and reproduces the leather pattern of the first working surface whereas the polyurethane layer is provided with primary and secondary grooves, corresponding to the ribs of the second mold working surface. If desired, the grooves may extend into the polyvinyl chloride layer to some extent. However, they should not go so far into the layer as to be visible from the free surface side thereof. The bonded first sandwich is shown in FIG. 6 with the primary groove 22 and secondary grooves 24 being visible. Primary groove 22 includes a smaller central groove 22a along the central longitudinal axis for purposes to be described hereinbelow. Free surface 8a of the polyvinyl chloride layer is not visible in the figure, but it is embossed with the leather pattern of the first working mold surface (e.g. see FIG. 7).

Figure 7:
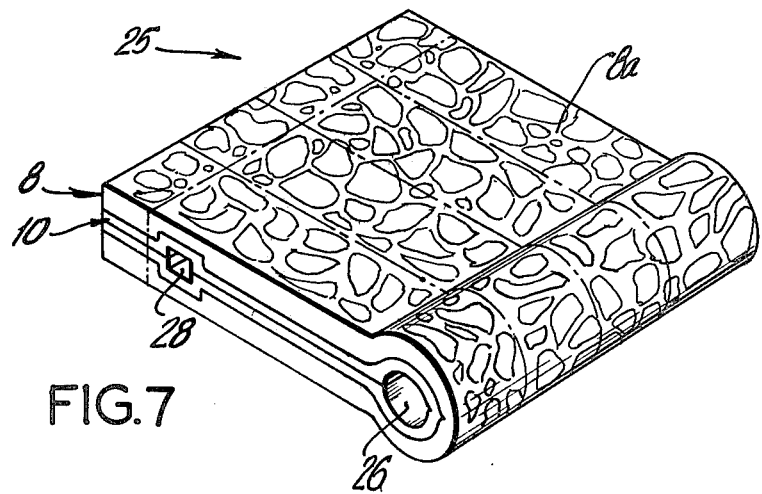
FIG. 7 is a perspective view of the sandwich obtained by folding the bonded first sandwich onto itself.

To provide the laminated sheet from which the strap buckle portion can be readily cut, the bonded first sandwich of FIG. 6 is first folded onto itself about the central longitudinal axis of primary groove 22 to provide a second sandwich 25 with the polyurethane layer 10 pressed onto itself and with loop 26 formed at one end by the folded over groove 22 and loop 28 near the other end by the grooves 24 being placed in face-to-face registry, as shown in FIG. 7. The folding operation may be performed manually or automatically by machines. To assist the folding operation and to ensure registry between the secondary grooves 24, the primary groove 22 preferably includes the smaller central longitudinal groove 22a. This smaller groove functions more or less as locating means for insuring that the fold is properly positioned. It is apparent from the figure that the free surface 8a of the polyvinyl chloride layers possesses the desired leather texture.

Figure 8:
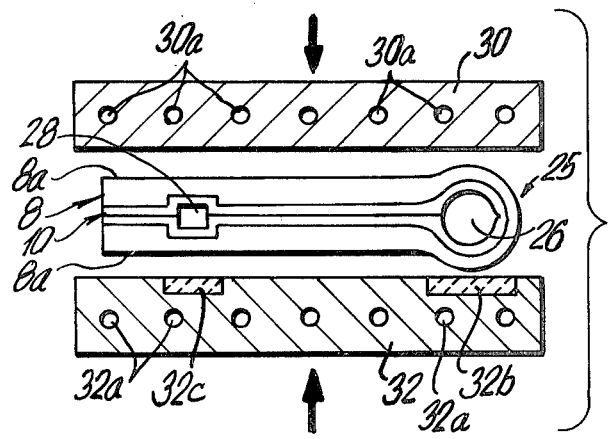
FIG. 8 is a schematic section of the pressure plate electrodes of the high frequency induction machine used to bond the second sandwich.

The final step in forming the laminated sheet from which the strap buckle portion can be cut comprises placing the second sandwich 25 in a suitable high frequency induction device and bonding under heat and pressure the polyurethane layer 10 to itself without closing the loops 26 and 28 and without seriously distorting the embossed free surface 8a of the polyvinyl chloride layer. FIG. 8 illustrates schematically a device for accomplishing this step. Pressure plate electrodes 30 and 32 are attached to a conventional high frequency induction device, for example, like that described above with respect to the flow molding step, the electrodes being movable toward one another as indicated by the arrows to apply pressure to the second sandwich 25 therebetween. To prevent distortion of the embossed free surface 8a of the polyvinyl chloride layer 8 during pressing and heating, the electrodes are each provided with cooling passages 30a and 32a to receive cooling water or the like which maintains the temperature of the free surface below the thermoplastic temperature so that little or not distortion occurs. The loops 26 and 28 are prevented from closing by providing insulating inserts 32b and 32c of acrylic, styrene and the like, adjacent each loop. The inserts serve to disrupt the electrical field through the loops and thereby prevent them from reaching a temperature at which the polyurethane layer would bond to itself. Although the loops may be somewhat compacted to a more or less oval form by the pressure of the electrodes, they do not close. The bonded second sandwich which forms the laminated sheet from which the buckle portion can be cut appears similar to FIG. 7 except that the loops are more oval in shape. For bonding the polyurethane layer to itself, a suitable frequency range for the electric induction heater is from 20 M $H_z$ to 60 M $H_z$ and suitable heating temperature ranges from 315° to 335° F. (157° to 168° C.). Pressure is maintained during heating, bonding and cooling for 8 to 20 seconds. Of course, the parameters for this bonding step as well as for the aforementioned flow molding step may be varied depending upon the types of thermoplastic materials employed, their thicknesses, the size of the sandwiches, type of mold as well as other factors. However, determination of suitable parameters for a particular situation is well within the skill of those in the art.

Figure 9:
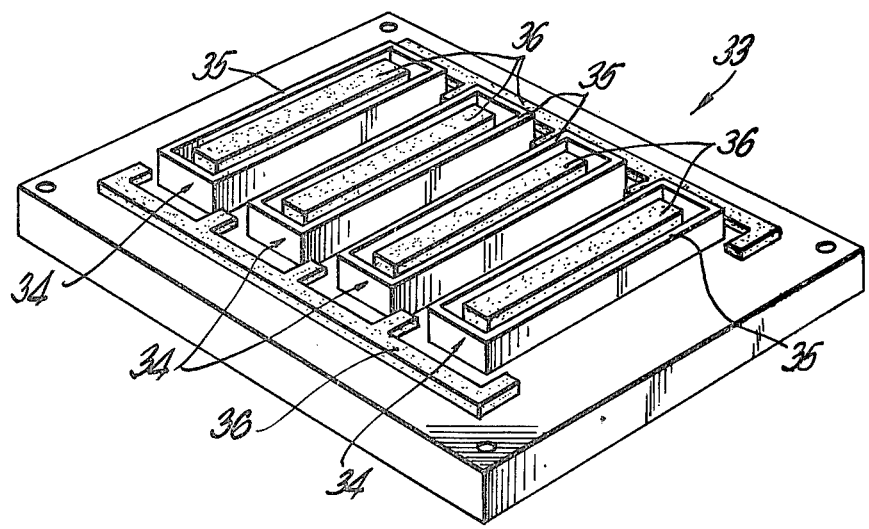
FIG. 9 is a perspective view of a die plate used to cut the strap shape from the laminated sheet.
Figure 10:
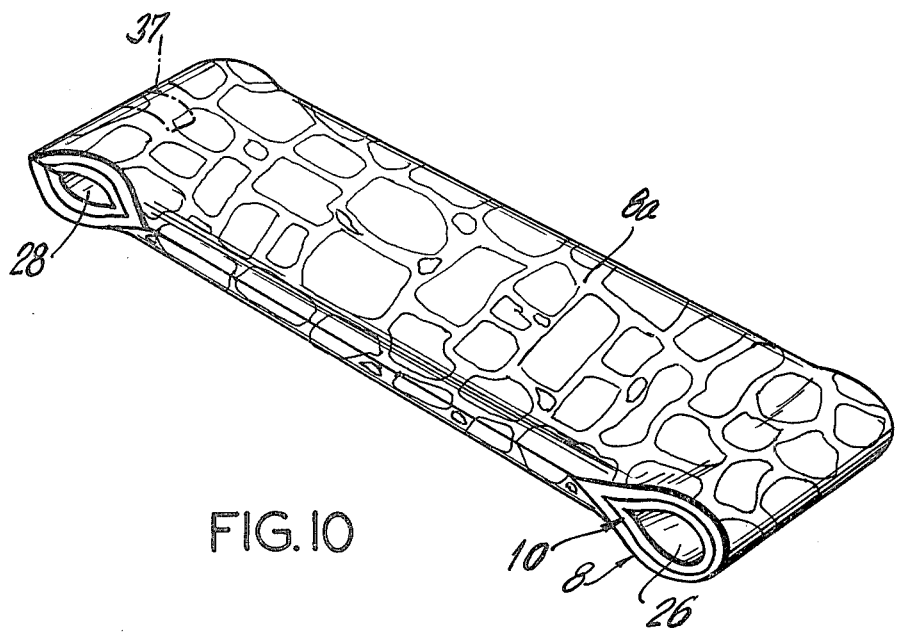
FIG. 10 is a perspective view of the buckle portion cut out of the laminated sheet.

Cutting of the buckle portion of the watch strap from the laminated thermoplastic sheet can be conveniently effected with conventional die cutters. In this case, the sheet is sheared cleanly by the dies and the layered structure of the strap is visible along the sides. In some applications, watch straps of this type are perfectly acceptable. However, if a more finished look is desired, the die cutter shown in FIG. 9 is utilized in combination with a high frequency induction like those already described. In the figure, the die cutter 33 includes four dies 34 for cutting four buckle portions simultaneously from the laminated sheet. The laminated sheet is placed on a suitable support with the longitudinal axis of the loops aligned cross-wise or transverse of the longitudinal axis of the dies. The die cutter functions as one electrode of the induction device, the other being the sheet support, and is lowered on the laminated sheet for cutting. The cutting edges 35 of the dies heat a narrow band of the laminated sheet in the outline of the desired strap portion as the dies are brought down onto the sheet. When cutting is effected the narrow band of the heated material, more specifically, the expanded layer is caused to flow plastically aorund the cut edges to hide the layered structure of the straps, for example, as shown in FIG. 10. The rounded and disguised edge imparts a much more finished appearance to the strap portion. However, in this cutting step, it is important that the cut edges adjacent each loop are not plastically flowed so as to close the side openings thereof, e.g. by means of a bottom die like that of FIG. 8 with insulating inserts. Thus, as shown in FIG. 10, the cut edges adjacent the loops 26 and 28 have a clean cut revealing the layered structure. Since the loop cross-section is rather small, however, this visible structure does not detract materially from the appearance of the strap portion. To prevent other areas of the strap from being heated, insulating inserts 36 of epoxy or plastic coated metal may be used. Typically, the die cutter shown in the figure is made of tool steel.

The buckle portion cut from te laminated sheet is shown in FIG. 10 with one loop 26 at one end thereof for the pin bar of the watch and the other loop 28 near the other end for the cross-pin of the buckle. The dotted line 37 represents a notch to be cut or cropped into the buckle for allowing the bail of the buckle to project therethrough. Although it is possible to cut the notch in the cutting step just described, it has been found more convenient to crop the end of buckle portion in a separate subsequent step. Preferably, the buckle portion is die cut to have a T-shaped end (not shown) corresponding to loop end 28. Then, the sides of the T and the notch are subsequently cropped in a separate step to produce the final buckle portion.

In another embodiment of the invention for forming a laminated sheet having loops at opposite ends for the cutting of buckle portions therefrom, two primary grooves are provided in at least the polyurethane layer and the bonded first sandwich of this type is folded along the longitudinal axis of each primary groove so that the folded-over ends abut one another with the polyurethane layer pressed onto itself and with a loop being formed at opposite ends by the folded-over groove portions. The folded-over ends which abut one another can be joined by heat sealing a cross-seam if desired. In this embodiment, only the side edges of the strap require cutting.

Of course, making the tongue portion of the watch strap involves similar steps as set forth above, except that the secondary ribs 12d of the mold 12 and the corresponding secondary grooves 24 of the bonded first sandwich are not necessary. After the U-shaped second sandwich is formed and bonded, the tongue-shaped portion can be die cut as described. The linear arrangement of holes in the tongue can be pierced during the die cutting operation or afterwards in a subsequent punching step.

All that remains to provide a finished watch strap is to place the watch pin bar in the loop of the tongue portion and the loop 26 of the buckle portion and to place the buckle in the loop 28 of the buckle portion. The artificial leather watch strap obtained by the present process is as good as a natural leather strap in terms of appearance, feel, flexibility and strength by properly selecting the thermoplastic materials, thickness, color and lustre. By using an expanded thermoplastic layer, such as expanded polyvinyl chloride, on what eventually becomes the outer layer of the strap, the strap exhibits low thermal conductivity and good flexibility due to the sponge-like structure containing minute cells on the surface and bears excellent resemblance to natural leather in touch.

While there has been described what is considered to be the preferred embodiment of the invention, other modifications will occur to those skilled in the art and it is desired to cover in the appended claims all such modifications as fall within the true spirit and scope of the invention.

I claim:

1. A method for making a laminated sheet from which a strap having a loop at least at one end for receiving the cross-pin of a watch, buckle and the like can be cut, comprising the steps of:
   (a) forming a first sandwich of at least a first layer of thermoplastic material, the free surface of which is embossable with a pattern, and at least a second layer of reinforcing thermoplastic material;
   (b) inserting the first sandwich into a mold with a first patterned working surface in contact with the free surface of the first embossable layer and a second working surface with an elongated projection in contact with the free surface of the second reinforcing layer and heating said sandwich under pressure to not only bond said first and second layers together but also emboss the pattern on the free surface of the first layer and form an elongated groove, corresponding to said elongated projection, in at least the second layer;
   (c) folding the bonded first sandwich onto itself about the longitudinal axis of the longitudinal groove to form a U-shaped second sandwich with the second reinforcing layer pressed onto itself and with a loop at one end formed by the folded-over groove portion;
   (d) bonding the second layer to itself by heating the second sandwich under pressure without closing the loop at said one end and without distorting the embossed free surface of the first layer.

2. The method of claim 1 wherein the first thermoplastic layer is an expanded thermoplastic sheet and the second thermoplastic layer is an unexpanded thermoplastic sheet.

3. The method of claim 2 wherein the expanded thermoplastic sheet comprises an expanded polyvinyl chloride or polyurethane sheet and the unexpanded sheet comprises a polyurethane sheet.

4. The method of claim 1 wherein the patterned working surface of the mold is made by pouring liquid silicon rubber over a replica of the pattern to be produced in the free surface of the first layer, allowing the rubber to set and then stripping the replica from the rubber mold surface.

5. The method of claim 4 wherein the replica is a sheet of natural leather.

6. The method of claim 1 wherein the first sandwich is heated in the mold by high frequency electric induction.

7. The method of claim 1 wherein the second reinforcing layer of the second sandwich is bonded to itself by high frequency electric induction heating under pressure.

8. The method of claim 7 wherein pressure is applied to the second sandwich by cooled electrode plates to prevent heating and distortion of the embossed free surface of the first layer, one of said plates having an insulating insert adjacent the loop of the second sandwich to prevent heating and thus closing thereof.

9. The laminated sheet produced by the method of claim 1.

10. A method for making a strap including a loop at least at one end for receiving the cross-pin of a watch, buckle and the like, comprising the steps of:
(a) forming a first sandwich of at least a first layer of thermoplastic material, the free surface of which is embossable with a pattern, and at least a second layer of reinforcing thermoplastic material;
(b) inserting a first sandwich into a mold with a first patterned working surface in contact with the free surface of the first embossable layer and a second working surface with an elongated projection in contact with the free surface of the second reinforcing layer and heating said sandwich under pressure in the mold to bond said first and second layers together as well as to emboss the pattern on the free surface of the first layer and to form an elongated groove, corresponding to said elongated projection, in at least the second layer;
(c) folding the bonded first sandwich onto itself about the longitudinal axis of the elongated groove to form a U-shaped second sandwich with the second reinforcing layer pressed onto itself and with a loop at one end formed by the folded over groove portion.
(d) bonding the second layer to itself by heating the second sandwich under pressure without closing the loop at said end and without distorting the embossed free surface of the first layer;
(e) cutting the desired shape of the strap from the bonded second sandwich with the loop at one end of the cut shape.

11. The method of claim 10 wherein the first thermoplastic layer is an expanded thermoplastic sheet and the second thermoplastic layer is an unexpanded thermoplastic sheet.

12. The method of claim 11 wherein the expanded thermoplastic sheet comprises an expanded polyvinylchloride or polyurethane sheet and the unexpanded sheet comprises a polyurethane sheet.

13. The method of claim 10 wherein the patterned working surface of the mold is made by pouring liquid silicone rubber over a replica of the pattern to be produced in teh free surface of the first layer, allowing the rubber to set and then stripping the replica from the rubber mold surface.

14. The method of claim 13 wherein the replica is a sheet of natural leather.

15. The method of claim 10 wherein the first sandwich is heated in the mold by high frequency electric induction.

16. The method of claim 10 wherein the second reinforcing layer of the second sandwich is bonded to itself by high frequency electric induction heating under pressure.

17. The method of claim 16 wherein pressure is applied to the second sandwich by cooled electrode plates to prevent heating and distortion of the embossed free surface of the first layer, one of said plates having an insulating insert adjacent the loop of the second sandwich and thus closing thereof.

18. The method of claim 10 wherein the cutting of the strap shape is conducted while the bonded second sandwich is at an elevated temperature so that the first layer flows plastically around the cut edges to hide the layered structure of the strap.

19. A strap produced by the method of claim 10.

20. A strap produced by the method of claim 18.

21. A method for making the buckle portion of a watch strap having a loop at opposite ends thereof, comprising the steps of:
(a) forming a first sandwich of at least one layer of expanded thermoplastic material, the free surface of which is embossable with a pattern, and at least one layer of unexpanded thermoplastic material;
(b) inserting the first sandwich into a mold with a first patterned working surface in contact with the free surface of the expanded layer and a second working surface with a primary elongated projection and at least one secondary elongated projection spaced parallel thereto in contact with the free surface of the unexpanded layer and heating said sandwich under pressure in mold to bond the expanded and unexpanded layers together as well as to emboss the pattern on the free surface of the expanded layer and to form a primary elongated groove and secondary elongated groove, corresponding to said elongated projections, in at least the unexpanded layer;
(c) folding the bonded first sandwich onto itself about the central longitudinal axis of the primary groove to form a U-shaped second sandwich with the unexpanded layer pressed onto itself and with the loop formed at one end by the folded-over groove portion and near the other end by the secondary groove in registry against the unexpanded layer;
(d) bonding the unexpanded layer to itself by heating the second sandwich under pressure without closing the loops at said ends and without distorting the embossed free surface of the expanded layer; and
(e) cutting the desired shape of buckle strap from the bonded second sandwich with the loops at opposite ends thereof.

22. The method of claim 21 wherein the second working surface of the mold includes two secondary projections spaced equidistant and parallel from the primary projection to form corresponding primary and secondary grooves in the unexpanded layer after heating in the mold and wherein the secondary grooves are placed in registry during the folding step to define the loop near said other end.

23. The method of claim 21 wherein the cutting of the strap shape is conducted while the bonded second sandwich is at an elevated temperature so that the expanded layer flows plastically around the cut edges to hide the layered structure of the strap.

24. A watch buckle strap made by the method of claim 21.

25. A method of making the tongue portion of a watch strap having a loop at one end for receiving the pin bar of the watch and linearly arranged holes at the other end for receiving the bail of a buckle, comprising the steps of:
(a) forming a first sandwich of at least one layer of expanded thermoplastic material, the free surface of which is embossable with a pattern, and at least one layer of unexpanded thermoplastic material;
(b) inserting the first sandwich into a mold with a first patterned working surface in contact with the free surface of the expanded layer and a second working surface with an elongated projection in contact with the free surface of the unexpanded layer and then heating said sandwich under pressure to bond said expanded and unexpanded layers together as well as to emboss the pattern on the free surface of the expanded layer and to form an elongated groove, corresponding to said elongated projection, in at least the unexpected layer;

(c) folding the bonded first sandwich onto itself about the longitudinal axis of the elongated groove to form a U-shaped second sandwich with the unexpanded layer pressed onto itself and with a loop at one end formed by the folded-over groove portion;

(d) bonding the unexpanded layer to itself by heating the second sandwich under pressure without closing the loop at said end and without distorting the embossed free surface of the expanded layer; and (e) cutting the desired shape of strap tongue from the bonded second sandwich with the loop at one end of the cut shape, including punching a plurality of linearly arranged holes in the other end of the cut shape.

26. The method of claim 25 wherein the cutting of the strap shape is conducted while the bonded second sandwich is at an elevated temperature so that the expanded layer flows plastically around the cut edges to hide the layered structure of the strap.

27. A watch tongue strap made by the method of claim 25.

* * * * *

UNITED STATES PATENT AND TRADEMARK OFFICE
CERTIFICATE OF CORRECTION

PATENT NO. : 4,183,986

DATED : January 15, 1980

INVENTOR(S) : Matthias Blaetterlein

It is certified that error appears in the above-identified patent and that said Letters Patent are hereby corrected as shown below:

Column 1, line 53: change "of silicone" to --a silicone--
Column 2, line 52: change "with" to --while--
Column 7, line 3: change "aorund" to --around--
Column 7, line 20: change "te" to --the--
Column 8, line 31, (claim 1): change "longitudinal groove" to --elongated groove--
Column 8, line 50 (Claim 4): Change "silicon" to --silicone--
Column 9, line 10 (Claim 10): Change "a first sandwich" to --the first sandwich--.

Signed and Sealed this

Twenty-ninth Day of April 1980

[SEAL]

Attest:

SIDNEY A. DIAMOND

Attesting Officer    Commissioner of Patents and Trademarks